United States Patent
La Rocca et al.

[15] 3,675,668
[45] July 11, 1972

[54] METHOD AND FLUIDIC CONTROL SYSTEMS FOR OPERATING A CAN CLOSING MACHINE

[72] Inventors: James J. La Rocca, La Grange; Blase J. Bartolomeo, Calumet City, both of Ill.

[73] Assignee: Continental Can Company, Inc., New York, N.Y.

[22] Filed: Jan. 22, 1971

[21] Appl. No.: 108,953

Related U.S. Application Data

[63] Continuation of Ser. No. 720,239, April 10, 1969, abandoned.

[52] U.S. Cl. ................................ 137/1, 137/81.5, 53/67
[51] Int. Cl. ........................................................ F15c 1/12
[58] Field of Search ................ 137/1, 81.5; 235/201; 53/67

[56] References Cited

UNITED STATES PATENTS

| | | |
|---|---|---|
| 3,423,990 | 1/1969 | Martin ........................... 137/81.5 X |
| 3,426,582 | 2/1969 | McArthur et al. ............... 137/81.5 X |
| 3,463,178 | 8/1969 | Kirchmier ........................ 137/81.5 |

*Primary Examiner*—William R. Cline
*Attorney*—Joseph E. Kerwin, William A. Dittman and Americus Mitchell

[57] ABSTRACT

A fluidic control system for operating a can closing machine of the type having one or two end stacks. This system has the property that the output of the system is determined by a timer on the machine and operates at a specific point in the system memory during a particular time interval in the machine cycle. Thus, variations in the spacing between cans entering the closing machine are permissible. This machine operates rapidly by use of fluidic interface valves.

22 Claims, 10 Drawing Figures

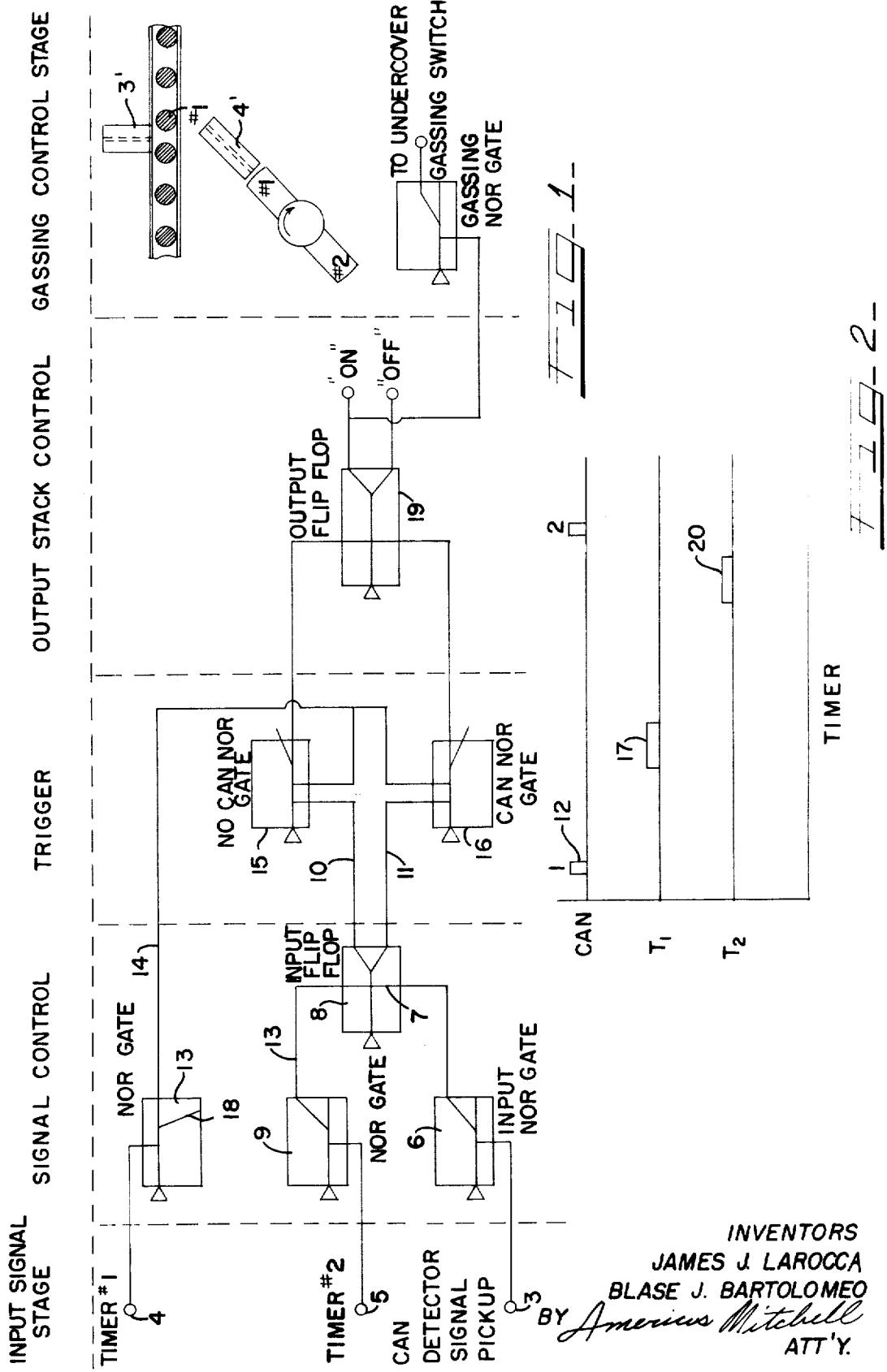

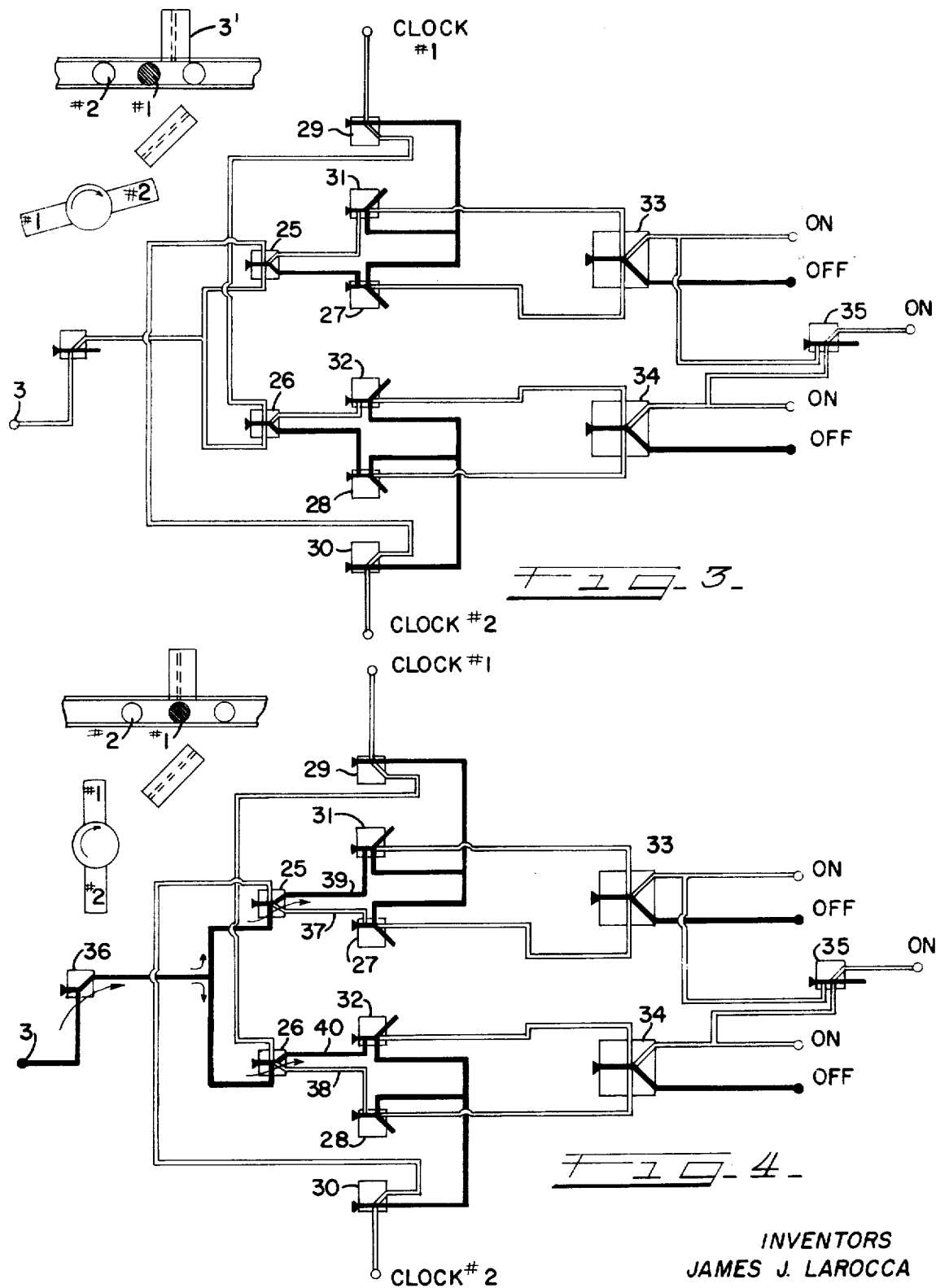

INVENTORS
JAMES J. LAROCCA
BLASE J. BARTOLOMEO
BY Americus Mitchell
ATT'Y.

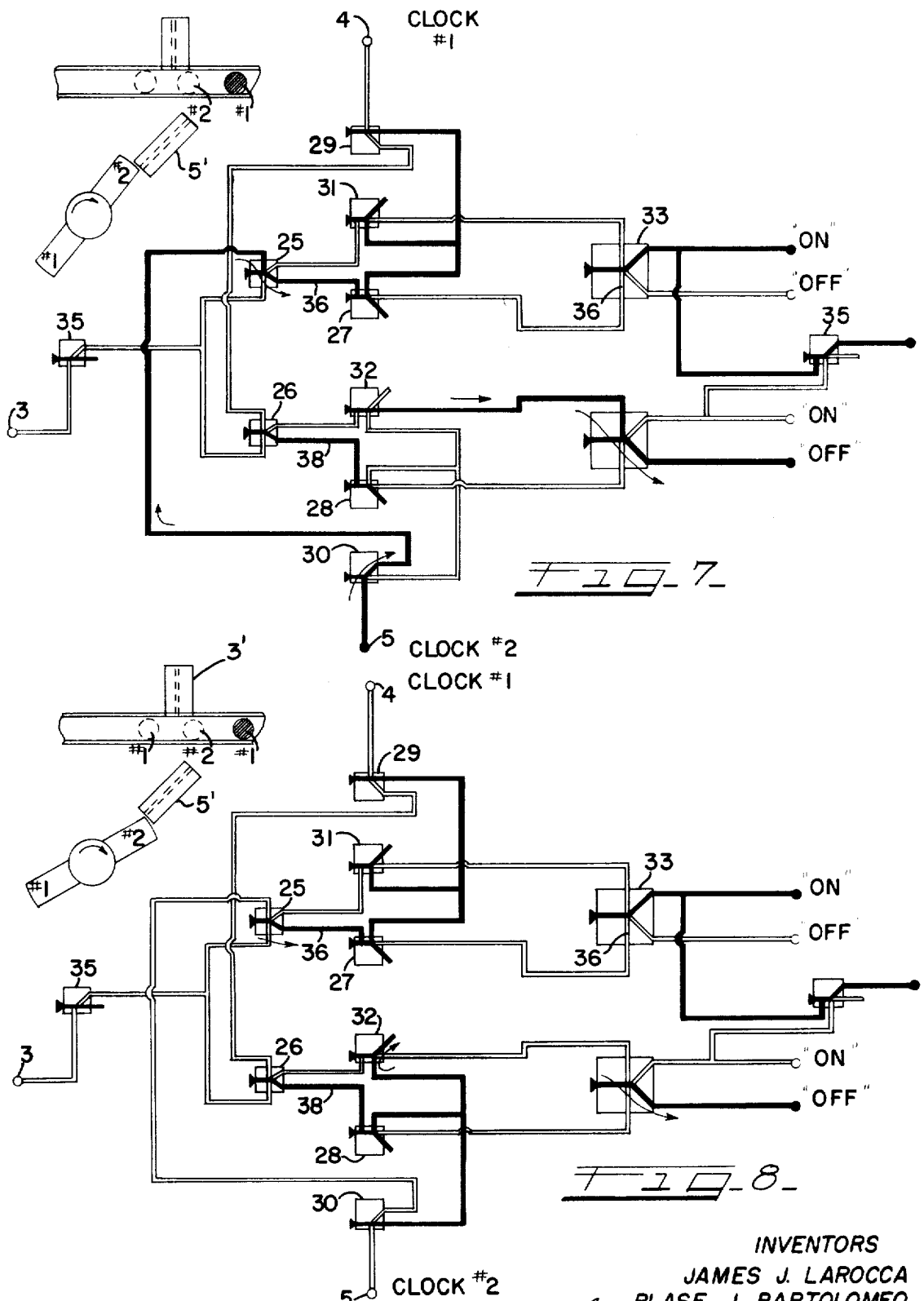

INVENTORS
JAMES J. LAROCCA
BLASE J. BARTOLOMEO
BY Americus Mitchell
ATT'Y.

METHOD AND FLUIDIC CONTROL SYSTEMS FOR OPERATING A CAN CLOSING MACHINE

This is a continuation of application Ser. No. 720,239, filed Apr. 10, 1969, now abandoned.

Our invention relates to a fluidic control system and more particularly to the fluidic control system for end feed control of a single or dual stack can closing machine wherein the feed line may have vacant positions at some points in the can feed line.

It is an object of our invention to provide a control system having a time interval in which a control signal may be fed to the system.

It is another object of our invention to gain the advantages inherent in the operation of a fluidic control device over an electromechanical device.

In brief, our invention has an input means from a fluidic proximity detector and one or two control circuits depending upon the number of operative elements being used to perform an operation upon one or more of a series of objects. As the series of objects pass an inspection station, the presence of each object at its proper place in the series is determined by the proximity detector which generates a signal indicative of the presence of a can at that particular position in the series. Any detector may be used depending on the characteristic of the object which is being examined. A timer is synchronized with the series of objects for coordination with them. The fluidic signal from the detector and a fluidic signal from the timer are coordinated by a fluidic control circuit to allow can ends, for example, to be placed on cans and to prevent a can end from being moved from the stack when a can is missing from a position in the series.

This control circuit is adapted for many uses such as rejection of defective articles from a series of articles, activation of a machine or device for altering the condition of certain articles in some way, inactivation of a machine or device so that the machine does not treat the article or articles having a certain characteristic or performing some operation in a given time as response to input criteria.

The disclosure below deals with the adoption of this circuit to the control of machines for closing cans as a specific use of the circuit for purposes of illustration.

The objects and advantages and uses of the invention will become apparent by making reference to the drawings, the claims and the following detailed description of a preferred embodiment.

FIG. 1 shows a schematic drawing of a fluidic control circuit for a single stack can closing machine.

FIG. 2 shows the timing sequence of signals to a single stack can closing machine.

FIG. 3 is a schematic drawing of a fluidic control circuit of a double stack machine running without cans.

FIG. 4 shows the fluidic control circuit condition when the first can is detected.

FIG. 7 shows the circuit condition after the empty No. 2 pocket passes the can sensor and the timer No. 2 hub operates to timer element.

FIG. 8 shows the fluidic circuit condition as the timer No. 2 hub leaves the timer and removes the No. 2 clock pulse.

Figure 5:
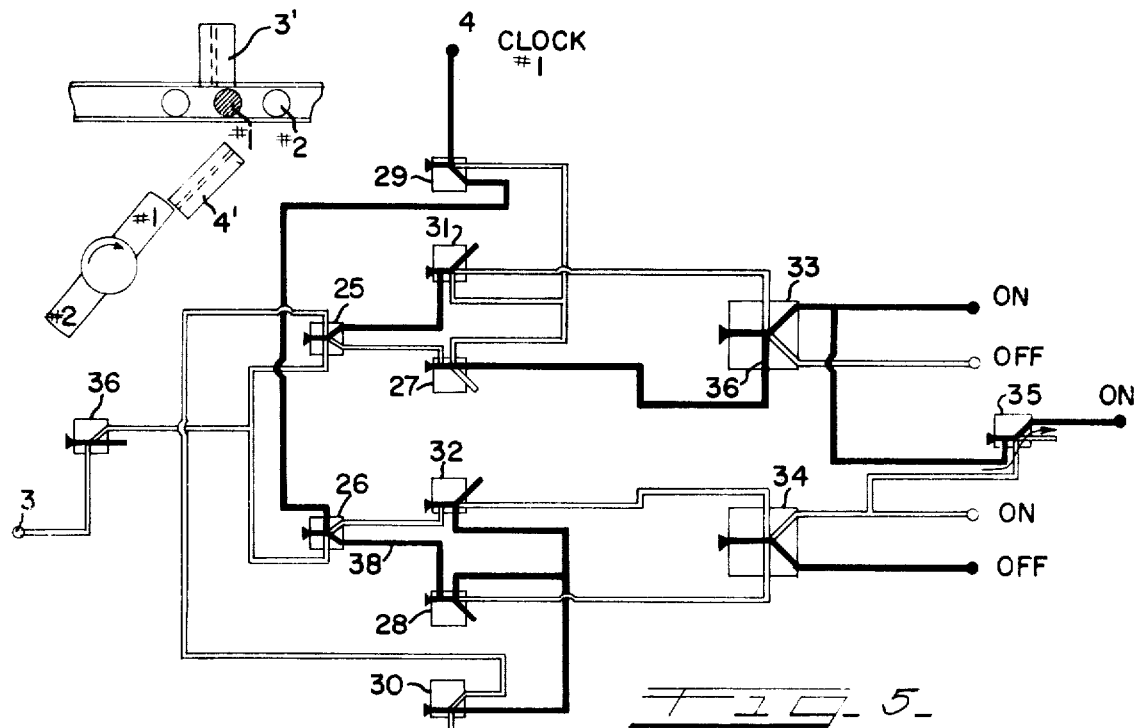
FIG. 5 shows the fluidic control circuit conduction when the timer No. 1 hub is detected by the timer element and the can has moved past the sensor.

The mode of control and the related apparatus of a single stack can top closing machine and a double stack can top closing machine are essentially similar to each other though in the case of the double stack can top machine the control system is more complex.

The operation of the single stack can feed control and the double stack can feed control is essentially similar. In general, the operation of both circuits comprises three basic steps as follows: signal set up, triggering, and resetting.

The single stack control system is the simpler of the two systems and for clarity and simplicity of explanation is considered first in some detail below;

As shown in FIG. 1 the three input signal elements of the single stack control circuit are a can detector input signal pickup 3, a clock No. 1 timer input signal element 4 and a clock No. 2 timer input signal element 5. When a can passes the can detector signal sensor 3', a pickup signal is generated and the signal from the can detector is conducted to an input NOR-gate 6. In the normal condition of the input NOR-gate 6 the power output of that gate passes straight through the NOR gate and passes to atmosphere or other neutral pressure regions. When the signal is fed to the NOR gate its output is switched and is conducted to one of the input signal control conduits 7 of input flip-flop 8. Since this control signal is unopposed by any impulse from the timer No. 2 NOR-gate 9 its impulse causes the flip-flop output to stay at the upper conduit 10 if it is initially there or to move from the lower conduit 11 to the upper conduit 10 if the flip-flop output is initially directed toward the lower conduit 11 of the bifurcated flip-flop output.

At the time the No. 1 can passes the can detector signal sensor 3', it generates signal 12 and causes the sequence of events described above the No. 1 timer is not operative and because the timer No. 1 NOR gate is in normal condition a blocking signal is conducted through line 14 from the No. 1 timer NOR-gate 13 to the no-can 15 and can 16 NOR gates (FIG. 1). However, shortly thereafter timer No. 1 generates a signal 17 (FIG. 2) which relieves the flow of pressure signal in line 14 and diverts it to overflow 18 and out of the circuit. Since the control impulse from the input flip-flop 8 affects only one or the other of the gates 15, 16 a diversion of timer No. 1 NOR gate output releases either the "no-can NOR gate" 15 or the "can NOR gate" 16 to its normal straight through flow condition and the output flip-flop 19 is either "on" or "off" depending on whether "no-can NOR gate" 15 or "can NOR gate" 16 first becomes normal and sends its flow straight through to the output flip-flop. Thus, the can end switch (not shown) is "on" when a can is in the feed line at the appropriate position or the can end switch is "off" if there is no can in the appropriate position in the feed line. The signal 20 generated by timer T2 resets the input flip-flop 8 so that its output goes into the lower branch 11 and the circuit is now ready to repeat the cycle.

If in the next cycle there is no can in the feed line then when timer No. 1 releases the "no-can" and "can NOR gates", the can end switch is in the "off" position and a can end is not fed to the vacant can position. In this situation, when timer T2 generates its reset signal 20 the input flip-flop 8 is not affected.

A brief statement and analysis of the operation of the end feed control logic sequence circuit is as follows:

This circuit can be broken into five stages for convenience of analysis as follows:

1. Signal input stage,
2. signal control stage,
3. trigger stage,
4. output stack control stage, and
5. gasing control stage.

These stages are identified in FIG. 1 and may be taken in conjunction with the explanation of operation of the single stack control system.

A principle feature of the circuit described above is the independence of the two timed stimulus signals. This independence allows the can stimulus to be varied in its timed spacing somewhat without destroying the operability of the circuit. Prior to this time it has been necessary for both of the variables, namely, a can signal and timer signal to have been timed to be simultaneous in order for the control mechanism of the single or dual stack to operate in the "on" position. In the single stack embodiment shown in the drawing, the can signal input may come at any time after the T2 signal and before the next T1 signal. This allows for variations to exist in the spacing of sequential cans due to wear of the can feed chains or to irregularities in the links or for any other reasons.

The illustrations of FIGS. 3–10 show the sequence of events in the operation of the dual stack embodiment. The operation of the dual stack fluidic control circuit is essentially the same as the single stack circuit discussed above and the same nomenclature is used. The control circuit for the dual stack machine is essentially a doubling of the control circuit of the single stack machine. A major adaptation to effect a control circuit for the dual stack machine is that in the dual stack embodiment timer No. 1 resets circuit No. 2 and timer No. 2 resets circuit No. 1 to effect an economy of timers and to ensure that the two branches of the system operate in synchronism to go through the sequence of operations to place ends on cans only when there are cans in the feed line at the capping station.

The double stack control circuit of FIG. 3 is shown in the condition brought about in the double stack fluidic control circuit when the feed line has been running without cans. As shown, a single can is in a No. 1 position and about to come into the proximity of the can sensor. When the circuit is in this condition and before the can blocks the can detector signal sensor the No. 1 and No. 2 feeds are "off" and the undercover gasing switch is "off." The fluidic devices operating in the circuit at this time are the No. 1 and No. 2 input bistable devices 25, 26 or flip-flop which feeds a biasing input to the No. 1 and No. 2 can NOR-gates 27, 28 and the timer No. 1 and No. 2 NOR-gates 29, 30 are in the unbiased normal condition operating to feed a biasing or blocking current to the four NOR-gates 27, 28, 31, 32 in the signal blocking stage of the circuit. The No. 1 and 2 output flip-flops 33, 34 are in the feed "off" position and the undercover gasing NOR-gate 35 is "off."

In general the signal sequence of this system is first, can detector signal from odd numbered can; second, trigger by clock No. 1 generated signal; third, can detector signal from even numbered can; and fourth, trigger by clock No. 2 generated signal and then the sequence is repeated. The can feed machine, the feed line, the timers, the sealing machine and the circuit inputs and outputs are all synchronized to give a smoothly operating machine.

As the first can comes up even with the can detector sensor 3', (FIG. 4) this can is detected and the signal is conducted to the signal input element 3. The can sensor may be a fluidic prOximity detector similar to the one shown in an application titled FLUIDIC PROXIMITY DETECTOR AND METHOD OF DETECTING OBJECTS to Blase J. Bartolomeo, Ser. No. 652,495, filed July 11, 1967 and assigned to the assignee of the present invention. As shown in FIG. 4 the can detector signal switches the input NOR gate 36 from normal which in its turn brings a larger pressure to bear upon the control channel of the No. 1 and No. 2 input flip-flop memory elements 25, 26 of the signal stage causing each of them to change the direction of its output flow from the lower 37, 38 to the upper 39, 40 of their two output channels. For convenience of operation a fluidic amplifier with a digital output may be inserted in the circuit between the can detector and the input NOR-gate 36. Now that the direction of output flow from the No. 1 and No. 2 input flip-flops 25, 26 has been changed, this direction will remain changed until some countermanding signal is fed into the input flip-flop devices. A memory is created in the circuit of the detection of a single can. When the can has passed the can sensor element 3', the input NOR-gate 36 resumes its normal position and no further pressure is fed from the input NOR gate 36 to the No. 1 and No. 2 input flip-flops 25, 26.

FIG. 5 shows the circuit situation after the first can has passed can detector sensor 3' and the No. 1 timer hub has turned sufficiently to block the No. 1 timer orifice 4'. The means for providing the timer pulse to the signal input elements 4 and 5 may be accomplished in many ways within the scope of our invention and the particular ways shown are for purposes of illustration. The sequence of operations is as follows: since no signal bias is on the input NOR-gate 36 this gate returns to its normal condition and the signal pressure from the input NOR-gate 36 is no longer applied to the Nos. 1 and 2 input flip-flops 25, 26. Shortly thereafter the timer No. 1 hub, which is continually turning, blocks the timer orifice 4' and the No. 1 timer NOR-gate 29 is switched and resets the No. 2 input flip-flop 26 to feed its output into the bottom conduit 38 and to the NO. 2 can NOR-gate 28. Of course, when the input NOR-gate 36 resumes its normal condition its signal to the No. 1 and No. 2 input flip-flop 25, 26 is removed. However, since there is no other change in the No. 1 input flip-flop 25 it continues giving a signal to the No. 1 no-can NOR-gate 31. The switching in the No. 1 timer NOR-gate 29 has one other effect in that it removes its signal from the No. 1 can NOR-gate 27 thereby permitting it to return to its normal position and pressure from the No. 1 can NOR-Gate 27 is conducted to an input of the No. 1 output flip-flop 33 to switch the No. 1 output flip-flop 33 from the feed "off" position to the feed "on" position. The output activates a mechanism to cause the can ends of this stack to be fed to the cans passing in the No. 2 position in the can feed line thus providing an end to allow closing of the can. When the No. 1 output flip-flop 33 is switched to the feed "on" position, the gasing NOR-gate 35 switches to operate the undercover gasing switch.

Figure 6:
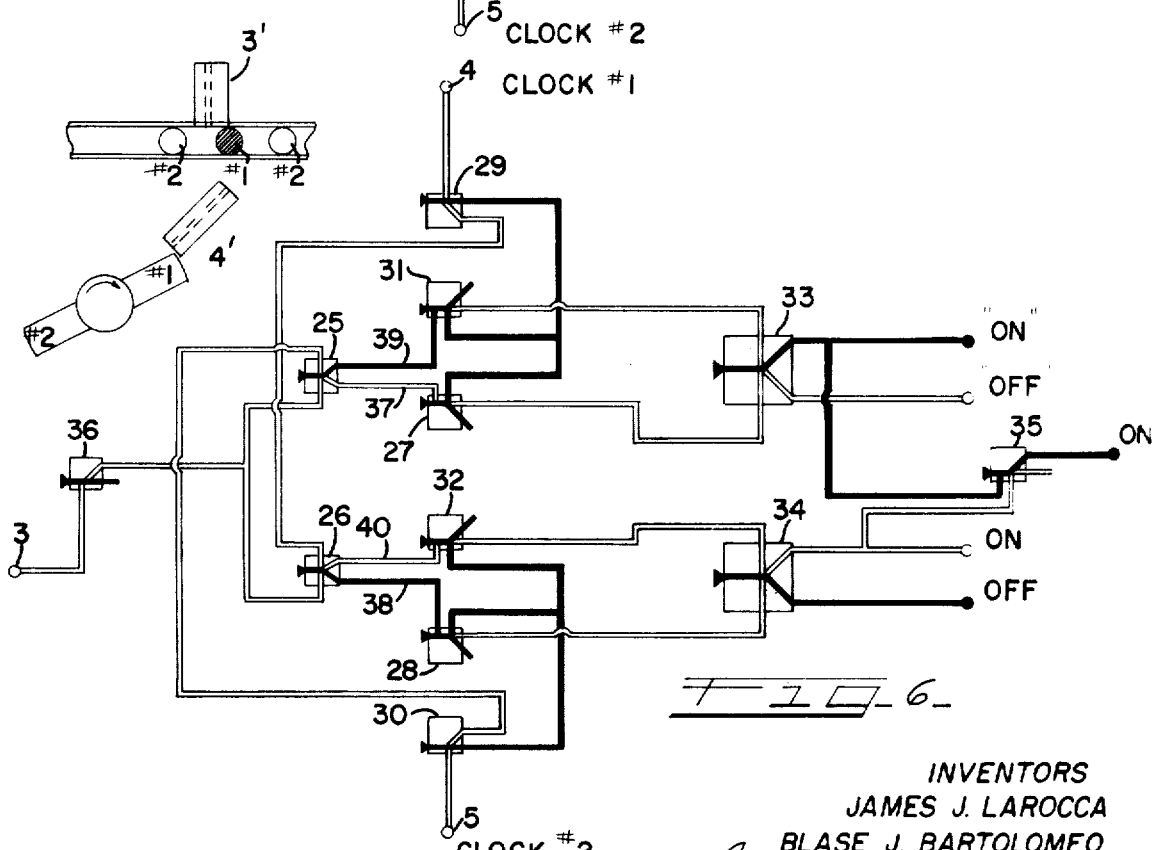
FIG. 6 shows the fluidic control circuit condition when the No. 1 timer hub has passed the timer element and removed the clock No. 1 signal.
Figure 9:
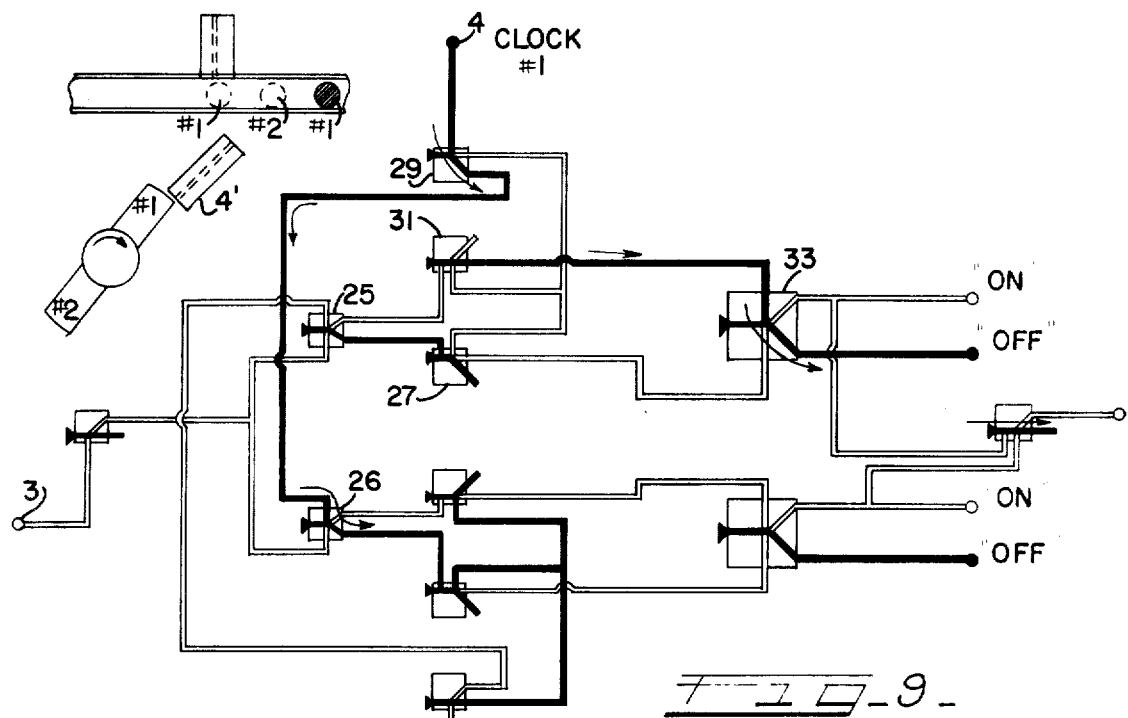
FIG. 9 shows the circuit condition when pocket No. 1 is empty and the No. 1 timer hub actuates the timer.

As the timer No. 1 hub continues to rotate it passes the timer orifice 4' as shown in FIG. 6. Once the hub has passed the orifice a switching impulse is no longer applied to the timer No. 1 NOR-gate 29 and the timer No. 1 NOR gate returns to its normal position and the No. 1 can NOR-gate 27 is diverted to the condition shown in FIG. 3. However, the No. 1 output flip-flop 33 retains its memory to maintain the No. 1 cover feed and undercover gasing NOR-gate 35 in an "on" position. All other elements of the circuit remain as they were before the timer No. 1 hub passed the timer orifice 4'. In normal operation the first can then passes the can closing station and a can top is in due course fastened onto the can.

The No. 1 circuit stays in the "on" condition until a No. 1 position in the feed line is empty.

The following discussion clarifies the circuit condition when a can is absent from a feed line position.

Shown in FIG. 7 is the circuit situation when the No. 2 timer hub comes opposite the timer orifice 5' and the No. 2 pocket does not hold a can. When the timer No. 2 hub blocks timer orifice 5', the timer No. 2 NOR-gate 30 is switched out of its normal condition and removes its blocking signals from the No. 2 can and no-can NOR-gates 28, 32 also with a consequent release or triggering of subsequent stages. The No. 1 input flip-flop is actuated by the timer No. 2 NOR gate to conduct its output through its alternate channel 36. The No. 1 feed remains "on" and the No. 2 feed remains "off." As the empty space in the feed line passes the No. 2 can end feed mechanism the empty can position passes without loss oF a can end because the No. 2 feed is "off" and the end feed device is not actuated to deliver an end to the missing can.

When the No. 2 timer hub passes the timer orifice 5' as shown in FIG. 8, the No. 2 clock impulse is removed and the No. 2 timer NOR-gate 30 resumes its normal flow to again block the No. 2 can and no-can NOR-gates 28, 32 and the No. 1 input flip-flop 25 retains its memory. The feed output situation remains unchanged from the preceding figure. It is noted that the No. 1 feed control is still in the "on" position. Since there is no can present in the No. 1 position now passing the can sensor 3', as shown in FIG. 8, it is desired that a can end not be fed to the empty position and a change of signals is necessary to avoid loss of can ends. This undesirable result is avoided because the No. 1 timer hub now comes adjacent the timer orifice 4' (FIG. 9) and biases the No. 1 timer NOR-gate 29 to remove the blocking signal from the No. 1 timer NOR-gate to the No. 1 can and no-can NOR-gates 27, 31. When the blocking signal is removed from the No. 1 no-can NOR-gate 31, this NOR gate returns to its normal condition and the output from its actuates the No. 1 output flip-flop 33 causing this gate to change its output signal from the feed "on" position to the feed "off" position thus preventing can end feed to the vacant No. 1 can position in the feed line when it passes the can feed station. At the same time the No. 1 timer NOR-gate 29 conducts pressure to the No. 2 input flip-flop 26 but this produces no change in the No. 2 system and the No. 2 system remains in the same condition as shown in FIG. 8.

The following is given to complete the explanation of the operation of our fluidic control circuit.

Figure 10:
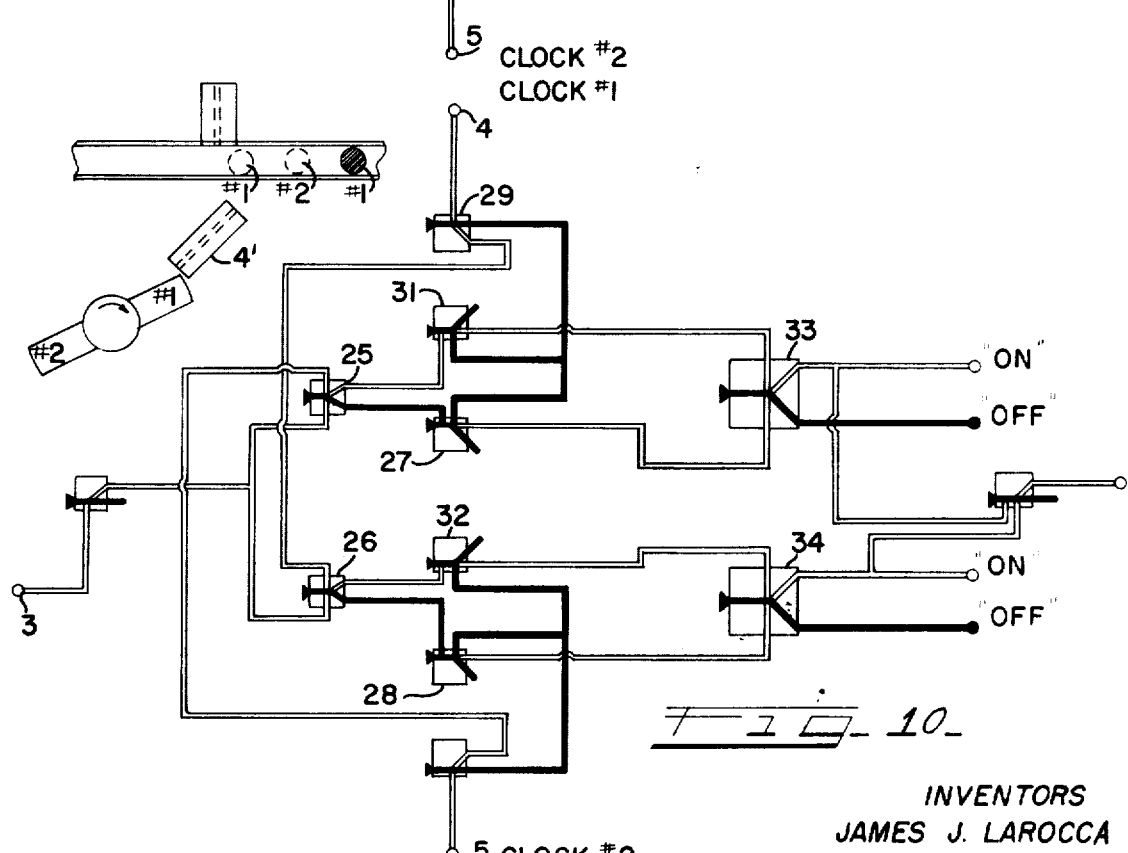
FIG. 10 shows the circuit condition when the No. 1 timer hub passes the timer and removes the signals from the No. 1 timer NOR gate.

FIG. 10 shows the condition when the No. 1 timer hub passes the timer orifice 4' and removes its signal from the No. 1 timer NOR-gate 29. When this happens, the fluidic control system returns to precisely the same condition as shown in FIG. 3. The signal, trigger and reset cycles can be repeated as many times as desired to either operate the end feed device or leave it in an inoperative or "off" condition.

It is understood that a vortex amplifier may be used to multiply the power output of the output flip-flop if more power is needed to operate later stages of the end feed control device in order to provide complete fluidic operation of this circuit.

Some of the advantages of the circuits of this invention as compared to a mechanical device or electrical circuit to perform the same functions are:

First, the timers are spaced independently so that irregularities of the can feed are tolerated.

Second, the timer interval can be adjusted to suit the particular situation which may arise.

Third, the fluidic control circuit is designed for high-speed operation and the closing of many containers per minute. In the fluidic system mechanical cam actuated valves are eliminated, and solenoid valves and since there are no moving parts in the circuits the elements can be actuated for every can without damage or wear to the control circuit in order to give longer life and less maintenance.

Fourth, the circuit has greater reliability and is easier to adjust than conventional equipment.

Although this circuit is described in connection with closing cans it is readily apparent that it has a more general utility. For example, it is readily adapted to sorting bottles fresh from the melt because the bottles are quite hot and conventional, mechanical or electrical devices would be affected and have short lives when exposed to the high temperatures of the bottles. In general, this fluidic circuit can be made to respond on an "all or none" basis to the presence or absence of some event and to transmit that information to a device to be controlled by that event.

The foregoing is a description of an illustrative embodiment of the invention, and it is applicant's intention in the appended claims to cover all forms which fall within the scope of the invention.

What is claimed is:

1. A fluidic circuit for signal storing and handling comprising:
   signal input means providing first fluidic signal outputs in response to input criteria;
   a plurality of signal control means for converting said first fluidic signals into a second set of fluidic signal outputs and having input means and output means,
   conduit means for conducting said first fluidic signal outputs to the inputs of said plurality of signal control means;
   triggering means controlled by said signal control means for releasing or blocking said second set of fluidic signals at the same rate of repetition as said input criteria and having input means and output means,
   conduit means for connecting said output means of said signal control means to said input means of said triggering means,
   a first bistable amplifier means for converting the output of said triggering means to a stronger control signal; and
   conduit means for connecting the outputs of said triggering means to the inputs of said first bistable amplifier means.

2. A fluidic circuit for signal storing and handling as set forth in claim 1, in which said plurality of signal control means comprises:
   a second bistable amplifier having a first and a second control input channels mounted in opposition and a first and a second output channels;
   a first and second NOR gates each having a control input channel and a control operated output channel;
   conduit means for conducting the signals from said output channel of said first NOR gate to the first control input channel of said second bistable amplifier;
   conduit means for conducting the signals from said output channel of said second NOR gate to the second control input channel of said second bistable amplifier.

3. A fluidic circuit for signal storing and handling set forth in claim 2 in which said triggering means comprises:
   a third NOR gate having a first and a second control input channel;
   a fourth NOR gate having a first and a second control input channel;
   a fifth NOR gate having a single control input channel, a control output channel and a relief output channel;
   a first conduit means connecting a fluidic signal output of said signal input means to the control input channel of said fifth NOR gate;
   second conduit means connecting an input channel of said third NOR gate to said first output channel of said second bistable amplifier;
   third conduit means connecting an input channel of said fourth NOR gate to the second output channel of said second bistable amplifier;
   fourth conduit means connecting the relief output channel of said fifth NOR gate to the second control input channel of each of said third and fourth NOR gates.

4. A fluidic circuit for signal storing and handling as set forth in claim 3 in which said signal input means comprises:
   a first fluidic timer means having an output channel and operating to give a signal in synchronism with a can conveyor means;
   conduit means connecting the output channel of said first timer means to the input control channel of said fifth NOR gate;
   a second fluidic timer means operating at the same repetitive speed as said first timer means and out of phase with said first timer means, whereby the signals from said first and second timer means arise at different times;
   conduit means connecting the output channel of said second timer means to the input control channel of said first NOR gate;
   can detector signal pick-up means for giving rise to a signal when a can passes the pick-up means and having an output channel; and
   conduit means connecting the output channel of said signal pick-up means to the input control channel of said second NOR gate.

5. Fluidic circuit for signal storing and handling comprising:
   signal generating means comprising three signal generators each connected to the control input channel of a separate NOR gate,
   a pair of signal conversion branches connected to said signal generating means and connected in parallelism to each other and adapted to receive signals from said signal generating means to convert these signals into a single control signal emanating from each branch to control at least one operative element, each said branch comprising:
   a first bistable amplifier element having one of its input control channels operatively connected to the output of a first signal conveying NOR gate, and having the other input control channel of said bistable amplifier connected to a second signal conveying NOR gate so that the signal from said first NOR gate and said second NOR gate operate in opposition to each other, means for receiving the signal from said first bistable amplifier and converting it into a signal for actuation of further means and, means for intermittently blocking transmission of signals in each channel.

6. A fluidic circuit for signal storing and handling as claimed in claim 5 in which, said signal generating means comprises:
a can detector unit comprising:
a fluidic can detector signal pickup means having an output channel,
a NOR gate having a control input channel connected to said output channel of said pickup means, and
a first periodic fluidic signal generating means having a timer for stopping gas exiting from an orifice to cause gas pressure backup to a control channel so that an input pressure is directed into the input channel of a NOR gate which channel is connected to said orifice, and,
a second periodic fluidic signal generating means having a timer for blocking gas exiting from an orifice to cause the gas pressure to backup into a control channel so that an input pressure is directed into the input channel of a NOR gate.

7. A fluidic circuit for signal storing and handling as claimed in claim 6 in which, said receiving and converting means comprises:
a pair of NOR gates each having dual input control channels, an input channel of each NOR gate being connected to a separate output of said first bistable amplifier and a second input channel of each said NOR gate being connected to the output of one of said second signal generating means, and,
a second bistable amplifier element having each of its control inputs connected to the output of one of said pair of NOR gates whereby said second bistable amplifier output may be used to control an operative means.

8. A fluidic circuit for signal storing and handling as claimed in claim 7 in which, said means for intermittently blocking transmission of signals comprises:
fluid pressure transmission means connected between the output of each of said second signal conveying NOR gates and the other signal input channel of said dual input channels of said pair of NOR gates whereby pressure from said second generating means blocks transmission of any signals through said pair of NOR gates.

9. A control circuit for signal storage and handling comprising:

fluidic signal means for generating a signal in response to the happening of each of a series of events and having an output channel;
first fluidic timer means for generating a signal at about the same rate as the periodically occurring event and having a signal output channel;
a first memory means having first and second control input channels connected in opposition, and first and second output channels, whereby the output flow passes through alternatively said first or second output channel depending upon which of said first or second signal control input channels received the last input signal;
conduit means connecting the output channel of said fluidic signal means to said first control input channel of said memory means;
conduit means connecting the output channel of said first fluidic timer means to said second control input channel of said first memory means;
a first NOR gate having a first and a second input control channel and an output channel for channeling fluidic output when a signal is applied to either of said input control channels and a throughput channel for channeling said output when no signal is applied to said input channels;
conduit means connecting said first output channel of said first memory means to the first input control channel of said first NOR gate;

a second NOR gate having a first and a second input control channel, an output channel for channeling fluidic output when a signal is applied to either of said input control channels and a throughput channel for channeling said output when no signal is applied to said input control channels;
conduit means connecting the second output channel of said first memory means to the first input control channel of said second NOR gate;
a second fluidic timer means for generating signals of the same periodicity and sequentially of said first fluidic timer means and having a signal output channel;
a third NOR gate having a single input control channel, a signal diversion channel and a throughput output channel;
conduit means connecting the channel of said second fluidic timer means to the single input control channel of said third NOR gate whereby when a signal is generated by said second fluidic time means fluidic output is diverted in said third NOR gate and when no signal is conducted into said input control channel, fluidic output is conducted through said throughput output channel;
conduit means connecting the throughput output channel of said third NOR gate to the second input control channel of said first and second NOR gates;
a second memory means having a first input control channel in opposition to a second input control channel and a first and second output channel functioning similar to said first memory means;
conduit means connecting the throughput channel of said first NOR gate to the first input control channel of said second memory means;
conduit means connecting the throughput channel of said second NOR gate to the second input control channel of said second memory means whereby the output of said second memory means is diverted to one or the other of said output channels depending upon which of said second or third NOR gates last gives a signal to said second memory means.

10. A control circuit for signal storage and handling of signals comprising:

fluid signal means for generating a signal in response to each happening of a periodically occurring event and having an output channel;
first fluidic timer means for generating a signal at about the same rate as the periodically occurring event and having a signal output channel and a throughput channel;
first memory means having first and second control input channels connected in opposition and first and second output channels whereby the output flow passes through either said first or second output channel depending on which of said first or second signal control channels received the last input signal;
conduit means connecting the output channel of said fluid signal means to said first control input channel of said memory means;
first trigger means having a first and second output channel for passage of output flow alternatively through the first or second channel during times when the trigger is released and having control input channels, whereby when a signal is applied to any control channel its corresponding throughput output channel is blocked and has no flow in it;
conduit means connecting said throughput channel of said first fluidic means to control input channels of said first trigger means;
conduit means connecting said first and second output channels of said first memory means to control input channels of said first trigger whereby when said trigger is released fluid flows through a first output channel of the trigger and no fluid flows through the second output channel of the trigger or visa versa depending on which control input channels have no signal input;

second memory means for preventing oscillation of the control circuit and having first and second control input channels mounted in opposition and first and second output channels whereby the output flows through said first output channel if a signal diverts the flow to said first output channel and the output flows through said second output channel if a signal diverts the flow to said second output channel;

conduit means connecting the first output channel of said trigger means to the first input channel of said second memory means;

conduit means connecting the second output channel of said trigger means to the second control input channel of said second memory means;

third memory means having first and second control input channels mounted in opposition and having first and second output channels whereby the output flows through said first output channel if a signal has diverted the flow to said first output channel and the output flows through said second output channel if a signal has diverted the output to said second output channel;

conduit means connecting said signal output channel of said first fluidic timer means to the first control input channel of said third memory means;

conduit means connecting said output channel of said fluid signal means to said second control input channel of said third memory means;

second fluidic timer means for generating a signal at the same rate of frequency as said first fluidic timer means but intermediate said signals of said first fluidic timer means and having a signal output channel and a throughput channel;

second trigger means having a first and a second output channel for passage of output flow through alternatively said first and second channels during the time that the trigger is released and having control input channels whereby when a signal is applied to any control channel its corresponding throughput output channel is blocked and has no flow in it;

conduit means connecting the first and second output channels of said third memory means to control input channels of said second trigger means;

conduit means connecting said throughput channel of said second timer means to control input channels of said second trigger means;

conduit means connecting said signal output channel of said second timer means to said second control input channel of said first memory means;

fourth memory means having first and second control input channels mounted in opposition and first and second output channels similar to said third memory means;

conduit means connecting the first output channel of said second trigger means to the first input channel of said fourth memory means; and conduit means connecting the second output channel of said second trigger means to the second input channel of said fourth memory means.

11. Apparatus for signal storage and handling comprising:

a fluid signal means for generating a fluidic signal in response to the happening of an event and having an output channel;

a first bistable amplifier having one input control channel in opposition to a second input control channel and a first and second output channel;

conduit means connected between the output channel of said fluid signal means and the first input control channel of said first bistable amplifier;

a first signal generating means for generating signals of a fixed periodicity and having an output channel;

a first NOR gate having a single input control channel and an output channel for channeling output when a signal is conducted into said input control channel and a throughput channel for allowing passage of fluidic output when no signal is applied to said input control channel;

conduit means connecting said output channel of said first signal generating means to said single input control channel of said first NOR gate;

a second bistable amplifier having one input control channel in opposition to a second input control channel and a first and second output channel;

conduit means connecting the output channel of said first NOR gate to the first input control channel of said second bistable amplifier;

a second signal generating means for generating signals of the same periodicity as said first signal generating means and having an output channel;

a second NOR gate having a single input control channel and an output channel for channeling fluidic output when a signal is conducted into said input control channel and a throughput output channel for channeling fluidic output when no signal is applied to said input control channel;

conduit means connecting said output channel of said second signal generating means to said single input control channel of said second NOR gate;

conduit means connecting the output channel of said second NOR gate to the second input control channel of said first bistable amplifier;

conduit means connecting the output channel of said fluid signal means to the second input control channel of said second bistable amplifier;

a third NOR gate having a first and a second input control channel and an output channel for channeling fluidic output when a signal is applied to either of said input control channels and a throughput channel for channeling said output when no signal is applied to said input channels;

conduit means connecting a first output channel of said first bistable amplifier to the first input control channel of said third NOR gate;

a fourth NOR gate having a first and a second input control channel, an output channel for channeling fluidic output when a signal is applied to either of said input control channels and a throughput channel for channeling said output when no signal is applied to said input channels;

conduit means connecting the second output channel of said first bistable amplifier to the first input control channel of said fourth NOR gate;

conduit means connecting the throughput channel of said first NOR gate to the second input control channel of each of said first and second two input control channel NOR gates;

a third bistable amplifier having a first input control channel in opposition to a second input control channel and a first and second output channel;

conduit means connecting the throughput channel of said third NOR gate to the first input channel of said third bistable amplifier;

conduit means connecting the throughput channel of said fourth NOR gate to the second input channel of said third bistable amplifier;

a fifth NOR gate having a first and a second input control channel and an output channel for channeling fluidic output when a signal is applied to either of said input control channels and a throughput channel for channeling fluidic output when no signal is applied to said input control channel;

conduit means connecting the first output channel of said second bistable amplifier to the first input control channel of said fifth NOR gate;

a sixth NOR gate having a first and a second input control channel, an output channel for channeling fluidic output when a signal is applied to either of said input control channels and a throughput channel for channeling said output when no signal is applied to said input channels;

conduit means connecting the second output channel of said second bistable amplifier to the first input control channel of said sixth NOR gate;

conduit means connecting the output channel of said second NOR gate to the second input control channel of said fifth and sixth NOR gates;

a fourth bistable amplifier having a first input control channel in opposition to a second input control channel and a first and second output channel;

conduit means connecting the throughput channel of said fifth NOR gate to the first input channel of said fourth bistable amplifier;

conduit means connecting the throughput output channel of said sixth NOR gate to the second input channel of said fourth bistable amplifier.

12. Apparatus for signal storage and handling as set forth in claim 11 further comprising:

a seventh NOR gate having a first and second input control channel, a first output channel for channeling fluidic output when a signal is applied to either of said input channels and a throughput channel for channeling said output when no signal is applied to said input channels;

conduit means connecting the first said output channel of said third bistable amplifier to the first input channel of said seventh NOR gate; and conduit means connecting the first output channel of said fourth bistable amplifier to the second input channel of said seventh NOR gate.

13. A control circuit for signal storage and handling comprising:

a fluid signal means for generating a fluidic signal in response to the happening of a periodically occurring event and having an output channel;

a first memory means having a first and a second input control channel mounted in opposition to each other and a first and a second output channel whereby the output flow passes through either said first or said second output channel depending on which of said first or second signal control channels last received a signal;

a second memory means having a first and a second control channel mounted in opposition to each other and a first and a second output channel whereby the output flow passes through either said first or said second output channel depending on which of said first or second signal control channels last received a signal;

conduit means connecting said output channel of said fluid signal means to said first input control channel of said first memory means;

conduit means connecting said output channel of said fluid signal means to said first input control channel of said second memory means;

a first fluidic signal generating means for generating signals at about the same periodicity as said periodically occurring event and having an output channel;

a first NOR gate having a single input control channel and a first output channel for channeling output when a signal is conducted into said input control channel and a second output channel for passage of fluidic throughput when no signal is applied to said input control channel;

conduit means connecting said output channel of said fluidic signal generating means to said input control channel of said first NOR gate;

conduit means connecting said first output channel of said first NOR gate to the first input channel of said second memory means whereby a reset signal may be conducted from said first NOR gate to said second memory means;

a second fluidic signal generating means for generating a repeating fluidic signal at a spaced interval from said first periodic signal;

a second NOR gate having a single input control channel and a first output channel for channeling output when a signal is conducted into said single input channel and a second output channel for allowing passage of fluidic throughput when no signal is applied to said input control channel;

conduit means connecting said first output channel of said second NOR gate to the second input channel of said first memory means whereby a reset signal may be conducted from said second NOR gate to said first memory means;

first trigger means having input channels for receiving the output of said first memory means, and having two throughput channels for alternatively conducting throughput through one or the other throughput channel depending upon which output channel of said first memory means is conducting;

conduit means connecting said second output channel of said first NOR gate to said trigger means whereby the throughput channels of said trigger means is blocked when a signal is conducted through said conduit means;

conduit means connecting the first output channel of said first memory means to said first trigger means whereby one throughput channel of said trigger means is blocked when a signal is conducted through said conduit means;

conduit means connecting the second output channel of said first memory means to said first trigger means whereby the second throughput channel of said trigger means is blocked when a signal is conducted through said conduit;

a third memory means for avoiding oscillation of the output of the control circuit each time that an event happens and having a first input control channel and a second input control channel in opposition to each other, and first and second output channels whereby the output flow passes through either said first or said second channel depending upon which of said first or second signal control channels last received a signal;

second trigger means having input channels for receiving the output of said second memory means and having two throughput channels for alternately conducting throughput through one or the other throughput channel depending upon which output channel of said second memory means is conducting;

conduit means connecting said second output of said first NOR gate to said trigger means whereby the throughput channels of said trigger means are blocked when a signal is conducted through said conduit means;

conduit means connecting the first output channel of said first memory means to an input channel of said second trigger means whereby the output of said trigger means is blocked when a signal is conducted through said conduit means;

a fourth memory means for avoiding oscillation of the output of the control circuit each time that an event happens and having a first input control channel and a second input control channel in opposition to each other and first and second output channels whereby the output flow passes through either said first or said second channel depending upon which of said first or second control channels last received a signal;

conduit means connecting said second output of said second NOR gate to input channels of said first trigger means whereby the throughput channels of said trigger means are blocked when a signal is conducted through said conduit means;

conduit means connecting said first output channel of said second memory means to an input channel of said second trigger means whereby the first output channel of said trigger means is blocked when a signal is conducted through said conduit;

conduit means connecting said second output channel of said second memory means to an input channel of said second trigger means whereby the second output channel of said trigger means is blocked when a signal is conducted through said conduit means;

conduit means connecting said first output channel of said second trigger to the first input channel of said fourth memory means; and, conduit means connecting said second output channel of said second trigger means to the second input channel of said fourth memory means.

14. A fluidic circuit for signal storing and handling comprising:

signal control means comprising:

a first and a second NOR gate each having an input control channel, an output channel for conducting fluidic output when a signal is applied to said input control channel and a throughput channel for conducting said output when no signal is applied to said input channel, a first bistable amplifier means having a first and a second input control channel and a first and a second output channel, and triggering means controlled by said signal control means for selectively inhibiting the output of said first bistable amplifier means and having input means and output means, conduit means for conducting the output of said output channel of said first NOR gate to the first input control channel of said first bistable amplifier means, conduit means for conducting the output of said output channel of said second NOR gate to the second input control channel of said first bistable amplifier means whereby the output of said first bistable amplifier goes through said first or second output channel, conduit means for conducting output of said first output channel of said first bistable amplifier means to a first part of the input means of said triggering means, conduit means for conducting the output of said second output channel of said first bistable amplifier means to a second part of the input means of said triggering means, a second bistable amplifier means for converting the output of said triggering means to a stronger unilateral control signal; and conduit means for connecting the outputs of said triggering means to the inputs of said second bistable amplifier means.

15. A fluidic circuit for signal storing and handling set forth in claim 14 in which said triggering means comprises:

a third and fourth NOR gate each having a first and a second control input channel, a control output channel for conducting fluidic output when a signal is applied to said first or second control input channel and a throughput channel for conducting said output when a signal is applied to said first or second input channel;

a fifth NOR gate having a signal control input channel, a control output channel and a throughput channel;

a first conduit means connecting a fluidic signal output of said signal input means to the control input channel of said fifth NOR gate;

second conduit means connecting an input channel of said third NOR gate to said first output channel of said second bistable amplifier;

third conduit means connecting an input channel of said fourth NOR gate to the second output channel of said second bistable amplifier;

fourth conduit means connecting the throughput channel of said fifth NOR gate to the second control input channel of each of said third and fourth NOR gates.

16. A fluidic circuit for signal storing and handling as set forth in claim 15 comprising further:

a detector signal pick-up means for giving rise to a signal upon the happening of an event in a sequence of events and having an output channel;

conduit means connecting the output channel of said signal pick-up means to the input control channel of said second NOR gate, a first fluidic timer means having an output channel and operating to give a signal in a speed synchronism and approximate relative phase synchronism with the sequence of events;

conduit means connecting the output channel of said first timer means to the input control channel of said fifth NOR gate;

a second fluidic timer means operating at the same repetitive speed as said first timer means and out of phase with said first timer means, whereby the signals from said first and second timer means arise at different times; and conduit means connecting the output channel of said second timer means to the input control channel of said first NOR gate.

17. A control circuit for signal storing and handling comprising:

fluidic signal means for generating an indicator signal in response to the happening of each of a series of periodically occurring events and having an output channel, a first fluidic signal generating means for generating signals at about the same periodicity as said periodically occurring event and having an output channel, a first NOR gate having a single input control channel and an output channel for channeling fluidic output when a signal is conducted into said input control channel and a throughput channel for passage of fluidic throughput when no signal is applied to said input control channel, a second fluidic signal generating means for generating a repeating fluidic signal at a spaced interval from said first fluidic signal, a second NOR gate having a single input control channel and an output channel for channeling fluidic output when a signal is conducted into said input control channel and a throughput channel for passage of fluidic throughput when no signal is applied to said input control channel, a first fluidic circuit means having a fluidic signal input channel and timer signal input means for controlling a function in response to the presence or absence of said indicator signal in response to the happening or not happening of alternate events of said series of periodically occurring events, first means connecting said output means of said fluidic signal means to said fluidic signal input channel of said first fluidic circuit;

second means for connecting said throughput channel of said first NOR gate to said timer signal input means of said first fluidic circuit, third means connecting said output channel of said second NOR gate to said timer input means of said first fluidic circuit, a second fluidic circuit means having a fluidic signal input channel and timer signal input means for controlling a function in response to the presence or absence of said indicator signal in response to the happening or not happening of the remaining events of said series of periodically occurring events, a fourth means connecting said output means of said fluidic signal means to said fluidic signal input channel of said second fluidic circuit, a fifth means connecting said throughput channel of said first NOR gate to said timer signal input means of said second fluidic circuit, and a sixth means connecting said output channel of said first NOR gate to said timer input means of said second fluidic circuit.

18. A method for controlling the operation of a device in response to the happening of each of a series of events comprising the steps of;

1. providing a first fluidic control signal indicative of the happening of an event;
2. providing a second fluidic signal input to said fluidic circuit from a first fluidic signal generator and starting sequentially after said first signal and having a predetermined cycle synchronized with the happening of said event with about the same interval between signals as between the events in said series;
3. providing a third fluidic signal input to said fluidic circuit from a second fluidic signal generator and starting at a different time from said first and second signals and having the same interval between signals as said second signals; and
4. combining and processing said first, second and third signal input in said fluidic circuit to give resultant signals indicative of the happening of each of said events and using said signal to control the operation of said device.

19. A method for controlling the operation of a device in response to the happening of each of a series of events as set forth in claim 18 in which;

said step of combining and processing said signals comprises the steps of:
1. conducting said first fluidic signal to a first control input channel of each of a said first and second bistable amplifier,
2. conducting said second fluidic signal to the second control channel of one of said first and second bistable amplifiers,
3. conducting said third fluidic signal to the second control channel of the remaining bistable amplifiers,
4. conducting the output of each of said bistable amplifiers to a further means to control the output of said means to indicate the happening of each of said events, and
5. periodically blocking the output of each of said further means.

20. A method for controlling the operation of a device in response to the happening of each of a series of events as set forth in claim 19 in which;
said step of periodically blocking the output of each of said further means comprising the steps of:
1. conducting one output of said first bistable amplifier to an input control channel of one of a first and second NOR gates,
2. conducting one output of said second bistable amplifier to an input control channel of one of a third and fourth NOR gates,
3. conducting a fourth signal to an input control channel of said third and fourth NOR gates when said second signal is absent, to block passage of the throughput of said third and fourth NOR gates,
4. conducting a fifth signal to an input control channel of a fifth and sixth NOR gates when said third signal is absent to block passage of the throughput of said first and second NOR gates,
5. conducting the throughput of said first NOR gate to a first control channel of a third bistable amplifier,
6. conducting the throughput of said second NOR gate to a second control channel of said third bistable amplifier,
7. conducting the throughput of said third NOR gate to a first control channel of said fourth bistable amplifier,
8. conducting the throughput of said fourth NOR gate to a second control channel of said fourth bistable amplifier,
9. conducting the output of said third bistable amplifier to first operative means to cause the operation of a first device, and
10. conducting the output of said fourth bistable amplifier to second operative means to cause the operation of a second device.

21. A method for controlling the operation of a device in response to the happening of an event as set forth in claim 18 in which;
said step of combining said signals comprises the steps of:
1. conducting said fluidic signals to the control input channel of one or more bistable amplifier means,
2. conducting the fluidic output of said bistable amplifier means to a further device for activation of said device.

22. A method for controlling the operation of a fluidically controlled device in response to the happening of each of a sequence of events as set forth in claim 21 in which;
said step of conducting said fluidic signals to the control input of a bistable amplifier means comprises the steps of:
1. conducting said first fluidic signal to a control input channel of a first bistable amplifier,
2. conducting said third fluidic signal to the other control input channel of said first bistable amplifier,
3. conducting the outputs of said first bistable amplifier to the control input channels of a pair of NOR gates,
4. conducting said second fluidic signal to the control input channels of said pair of NOR gates,
5. conducting the outputs of each said NOR gate to opposite sides of the control input channels of a second bi-stable amplifier.

* * * * *